United States Patent
Song et al.

(10) Patent No.: US 12,316,678 B2
(45) Date of Patent: May 27, 2025

(54) SECURITY AUDIT OF DATA-AT-REST

(71) Applicant: Cisco Technology, Inc., San Jose, CA (US)

(72) Inventors: Yang Song, Shanghai (CN); Cheng Pan, San Jose, CA (US); Qingliang Lin, Shanghai (CN); Plamen Nedeltchev, San Jose, CA (US); Xuanbei Lu, Cary, NC (US); Fangyan Ye, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 18/108,769

(22) Filed: Feb. 13, 2023

(65) Prior Publication Data

US 2024/0275818 A1    Aug. 15, 2024

(51) Int. Cl.
| | |
|---|---|
| *G06F 15/16* | (2006.01) |
| *G06F 9/54* | (2006.01) |
| *G06F 16/16* | (2019.01) |
| *G06F 16/185* | (2019.01) |
| *H04L 9/40* | (2022.01) |
| *H04L 29/06* | (2006.01) |

(52) U.S. Cl.
CPC ............ *H04L 63/20* (2013.01); *G06F 16/164* (2019.01); *G06F 16/185* (2019.01)

(58) Field of Classification Search
CPC ....... H04L 63/20; G06F 16/164; G06F 16/185
USPC .......................................................... 726/1
See application file for complete search history.

(56) References Cited

U.S. PATENT DOCUMENTS

| | | | |
|---|---|---|---|
| 6,078,913 A * | 6/2000 | Aoki ................ | G06F 16/951 |
| 7,065,532 B2 * | 6/2006 | Elder ............... | G06F 16/38 |
| | | | 706/50 |
| 8,745,384 B2 | 6/2014 | Persaud et al. | |
| 9,430,564 B2 | 8/2016 | Ahuja et al. | |
| 10,162,956 B1 * | 12/2018 | Truong ............. | G06Q 10/10 |
| 10,685,748 B1 | 6/2020 | Chappell et al. | |
| 11,349,855 B1 * | 5/2022 | Amit ................ | G06F 9/547 |
| 11,366,843 B2 * | 6/2022 | Maier .............. | G06F 40/247 |
| 11,431,494 B2 | 8/2022 | Gallancy et al. | |

(Continued)

OTHER PUBLICATIONS

"Digital Guardian—Compliance", online: https://digitalguardian.com/solutions/compliance, accessed Feb. 2, 2023, 1 page.

(Continued)

*Primary Examiner* — Hamza N Algibhah
(74) *Attorney, Agent, or Firm* — BEHMKE INNOVATION GROUP LLC; James M. Behmke; James J. Wong

(57) ABSTRACT

In one embodiment, an illustrative method herein may comprise: recognizing, by a device, key entries within a textual data set having a plurality of files; forming, by the device, a group of files by selecting a subset of the plurality of files that are considered by the device to be similar according to a tolerance-based similarity metric and a bi-dimensional hierarchical multiclass classification; generating, by the device, a metadata profile for the group of files by aggregating metadata from its constituent files; and causing, by the device and based on the metadata profile, a risk identification or remediation action to be performed on the textual data set.

20 Claims, 9 Drawing Sheets

(56) References Cited

U.S. PATENT DOCUMENTS

| | | | | |
|---|---|---|---|---|
| 2002/0010708 | A1* | 1/2002 | McIntosh | G06F 16/93 715/201 |
| 2003/0177118 | A1* | 9/2003 | Moon | G06F 16/353 707/999.005 |
| 2004/0078386 | A1* | 4/2004 | Moon | G06F 16/353 707/999.102 |
| 2005/0060643 | A1* | 3/2005 | Glass | H04L 51/212 715/205 |
| 2006/0136398 | A1* | 6/2006 | Suomi | G06F 30/00 |
| 2007/0162320 | A1* | 7/2007 | Joshi | G06F 21/6218 713/166 |
| 2010/0125502 | A1* | 5/2010 | Solomon | G06Q 30/02 705/14.52 |
| 2010/0235392 | A1* | 9/2010 | McCreight | G06F 21/6209 707/E17.014 |
| 2010/0332428 | A1* | 12/2010 | McHenry | G06F 16/93 707/E17.09 |
| 2011/0184960 | A1* | 7/2011 | Delpha | G06F 40/169 707/769 |
| 2013/0073514 | A1* | 3/2013 | Cai | G06F 16/951 707/E17.022 |
| 2013/0212111 | A1* | 8/2013 | Chashchin | G06F 40/284 707/740 |
| 2013/0247215 | A1* | 9/2013 | Ueno | G06F 21/577 726/27 |
| 2014/0188830 | A1* | 7/2014 | deVille | G06F 16/355 707/738 |
| 2014/0236999 | A1* | 8/2014 | Faitelson | G06F 16/1774 707/785 |
| 2017/0193291 | A1* | 7/2017 | Lucchese | G06F 40/284 |
| 2017/0193588 | A1* | 7/2017 | Loui | G06F 16/583 |
| 2019/0108236 | A1* | 4/2019 | Balachandran | G06F 16/4393 |
| 2019/0197154 | A1* | 6/2019 | Cohen | G06F 16/583 |
| 2019/0272419 | A1* | 9/2019 | Reihl | G06F 40/106 |
| 2020/0012851 | A1* | 1/2020 | Stanley | G06V 30/418 |
| 2020/0265261 | A1* | 8/2020 | Dalal | G06V 20/635 |
| 2021/0027053 | A1* | 1/2021 | Reihl | G06V 10/82 |
| 2021/0119989 | A1 | 4/2021 | Lim | |
| 2021/0258168 | A1* | 8/2021 | Decoux | H04L 9/3239 |
| 2022/0172039 | A1* | 6/2022 | Liu | G06N 3/08 |
| 2023/0325735 | A1* | 10/2023 | Torstensen | G06Q 10/101 705/7.17 |
| 2024/0275818 | A1* | 8/2024 | Song | G06F 16/185 |

OTHER PUBLICATIONS

"Apache Tika—a content analysis toolkit", online: https://tika.apache.org/, accessed Feb. 2, 2023, 16 pages, The Apache Softare Foundation.

"Tesseract OCR", online: https://github.com/tesseract-ocr/tesseract, Dec. 2022, 4 pages, GitHub, Inc.

"Industrial-Strength Natural Language Processing", online: https://spacy.io/, accessed Feb. 2, 2023, 10 pages.

"Scikit-Learn", online: https://scikit-learn.org/stable/, accessed Feb. 2, 2023, 2 pages.

"XGBoost Documentation□", online: https://xgboost.readthedocs.io/en/stable/, accessed Feb. 2, 2023, 3 pages.

"Overcoming the Challenges of Data Classification", online: https://www.cyberhaven.com/resources-white-papers-overcoming-the-challenges-of-data-classification-thank-you/, accessed Feb. 2, 2023, 14 pages, Cyberhaven.

Hart, et al., "Text Classification for Data Loss Prevention", PETS 2011. Lecture Notes in Computer Science, vol. 6794, 21 pages, Springer, Berlin, Heidelberg.

Fox, et al, "Learn about the data loss prevention on-premises scanner", online: https://learn.microsoft.com/en-us/microsoft-365/compliance/dlp-on-premises-scanner-learn?view=o365-worldwide, Jan. 31, 2023, 4 pages.

Fox, et al., "Learn about data loss prevention", online: https://learn.microsoft.com/en-us/microsoft-365/compliance/dlp-learn-about-dlp?view=o365-worldwide, Jan. 30, 2023, 12 pages.

* cited by examiner

| COARSE CLASSIFICATIONS 610 | FINE CLASSIFICATIONS 620 |
|---|---|
| HR Dept | Benefits |
| | Offer |
| | Resume |
| | Guideline |
| | Meeting Minutes |
| | Policy |
| | Assessment Report |
| | Award |
| | Other |
| Finance Dept | Invoice |
| | Transaction History |
| | Meeting Minutes |
| | Policy |
| | Other |
| Legal Dept | Meeting Minutes |
| | Policy |
| | Assessment Report |
| | Legal Notice |
| | Agreement |
| | NDA |
| Engineering Dept | Test Script |
| | Source Code |
| | Meeting Minutes |
| | Product Requirement |
| | Design Spec |
| | Roadmap |

SECURITY AUDIT OF DATA-AT-REST

TECHNICAL FIELD

The present disclosure relates generally to computer networks, and, more particularly, to the security audit of data-at-rest.

BACKGROUND

Intellectual property and customer data are the highest level of confidentiality for any company. The leakage of this sensitive data can cause great reputational damage, impacting competitive advantage, damaging customer relationships, and loss of revenue. The General Data Protection Regulation (GDPR) of the European Union has made companies liable for the protection of sensitive data such as Personally Identifiable Information (PII), credit card information, etc.

The data leakage is typically focused on data-in-transit and data-at-rest. Data-at-rest, in particular, is also particularly vulnerable to data breaches caused by malicious attacks and insider threats. Many of the most spectacular data breaches in the last ten years involved the theft of data-at-rest. A data breach can occur quickly; however, it may take a long time to discover, or may never be discovered.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example of coarse and fine classifications in accordance with one or more embodiments described herein;

DESCRIPTION OF EXAMPLE EMBODIMENTS

Overview

According to one or more embodiments of the disclosure, an illustrative method herein may comprise: recognizing, by a device, key entries within a textual data set having a plurality of files; forming, by the device, a group of files by selecting a subset of the plurality of files that are considered by the device to be similar according to a tolerance-based similarity metric and a bi-dimensional hierarchical multi-class classification; generating, by the device, a metadata profile for the group of files by aggregating metadata from its constituent files; and causing, by the device and based on the metadata profile, a risk identification or remediation action to be performed on the textual data set.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
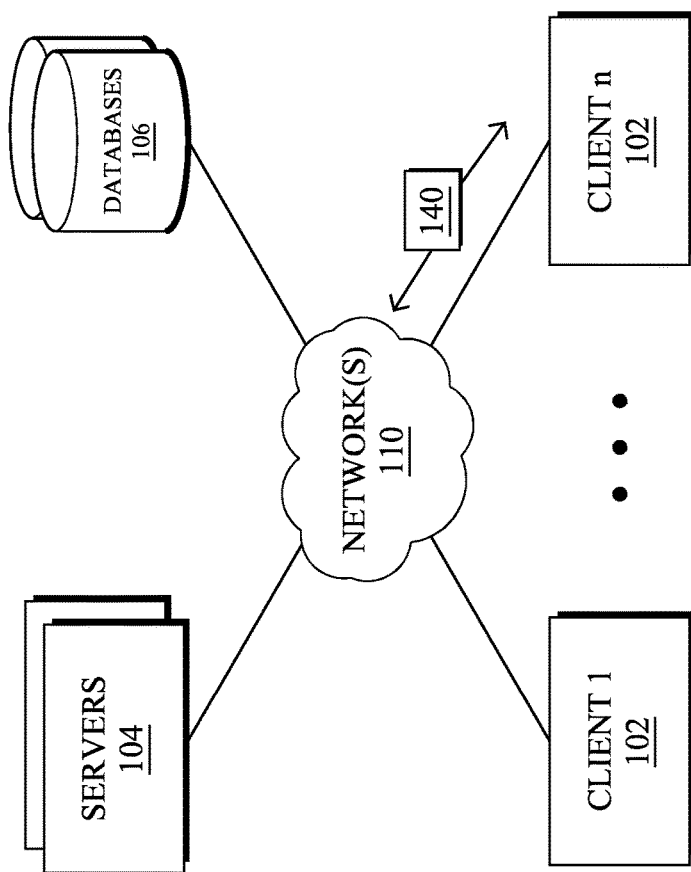
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or endpoint devices configured to interface with the techniques herein. For example, client devices 102 may include, but are not limited to, desktop computers, laptop computers, tablet devices, smartphones, wearable devices (e.g., heads-up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on-prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit disclosure.

Notably, web services can be used to provide communications between electronic and/or computing devices over a network, such as the Internet. A website is an example of a type of web service. A website is typically a set of related web pages that can be served from a web domain. A website can be hosted on a web server. A publicly accessible website can generally be accessed via a network, such as the Internet. The publicly accessible collection of websites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
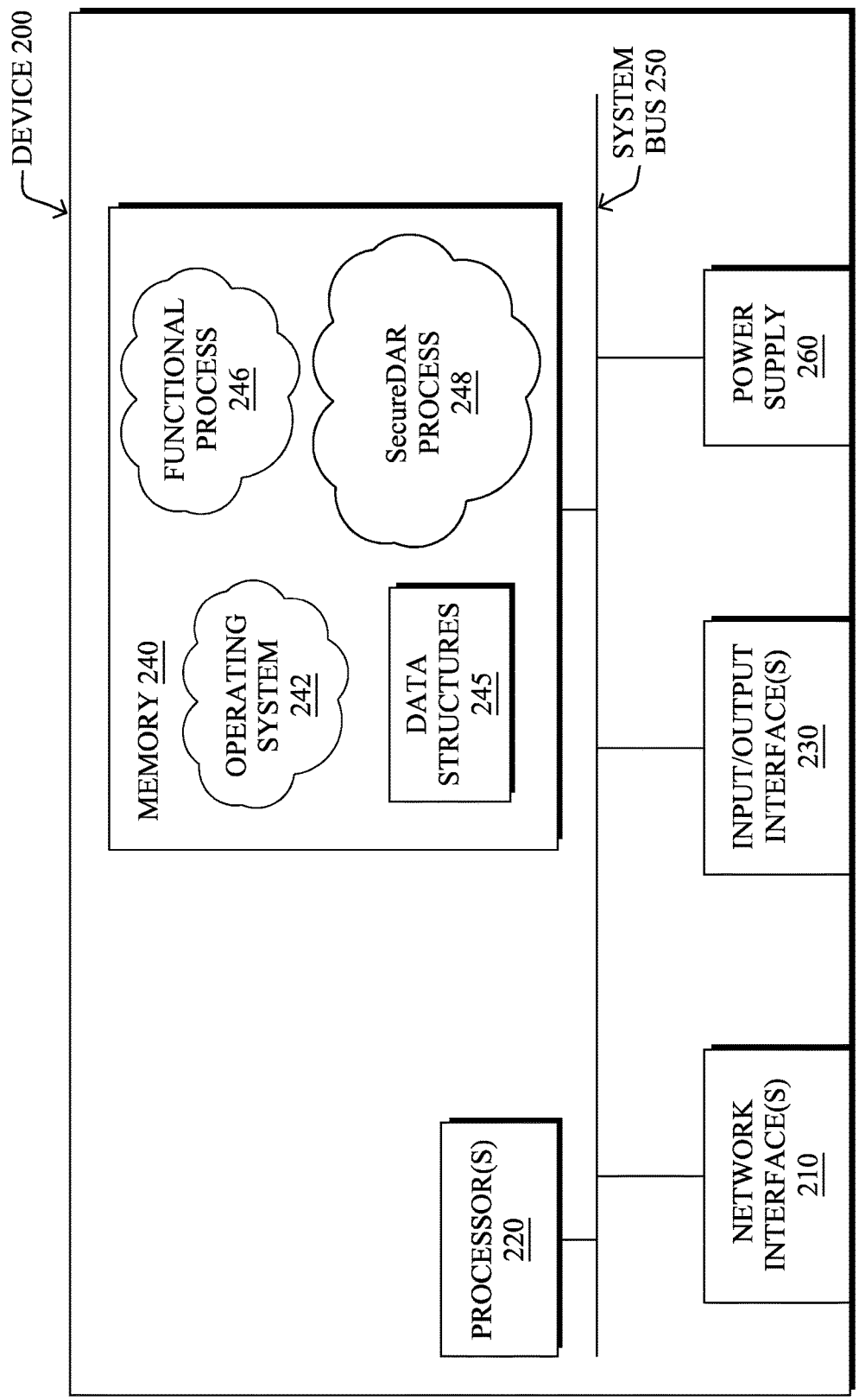
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "secure data-at-rest" or "SecureDAR" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Secure Audit of Data-at-Rest—

As noted above, the leakage of sensitive data can be problematic both for company business as well as for regulatory compliance. Of the two types of data leakage, data-in-transit and data-at-rest, data-at-rest is particularly vulnerable to malicious attacks and insider threats, and may be very difficult to discover.

In this era, an enterprise has a huge amount of digital content, multiple copies of content spread across various locations, often without proper classification or categorization. It is a big challenge for an enterprise to get a good inventory of its digital content. Data-at-rest may be located on filers, desktops, laptops, any of a plurality of cloud storage locations, and so on. The need to discover where the data is and what the data is (e.g., whose data it is, what are the access permissions, etc.) is crucial for the enterprise's data security strategy.

The techniques herein, therefore, provide an end-to-end security solution for persistent and pervasive audit for all enterprise documents, that identifies their sources, lineage, and level of confidentiality, and promptly notifies the owners of the data, as well as provide an automated remedy to the categorized documents. That is, the security audit of data-at-rest (or "SecureDAR") according to the embodiments herein significantly improves an organization's security posture by providing insightful visibility of classified information. As described in greater detail below, in particular, the techniques herein provide for i) semantics analysis based on natural language processing (NLP) to detect and identify personally identifiable information (PII), personal health information (PHI), and payment card industry (PCI) data with higher accuracy; ii) a bi-dimensional classification approach to more accurately identify the owner and target usage of the documents with no prior labeling, and iii) combining multiple grouping strategies to boost security metadata identification capabilities.

Figure 3:
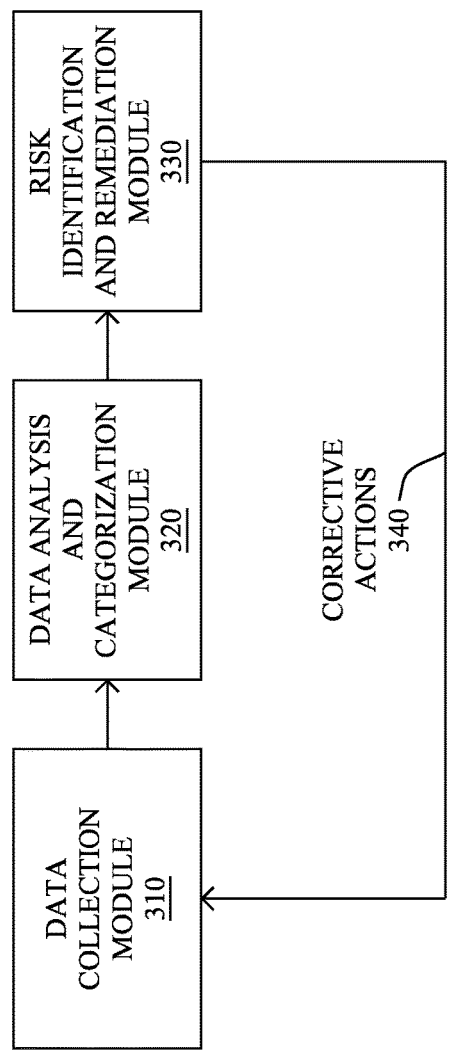
FIG. 3 illustrates an example of a security audit of data-at-rest system in accordance with one or more embodiments described herein.

Specifically, according to one or more embodiments of the disclosure as described in detail below, Operationally, and with reference to FIG. 3, the secure data-at-rest (SecureDAR) system 300 is based on three major components, each described in greater detail below:

1) Data Collection Module 310 (e.g., to discover data);
2) Data Analysis and Categorization Module 320 (e.g., to calculate a risk score); and
3) Risk Identification and Remediation Module 330 (e.g., remediation to identify risks and take policy-based corrective actions 340).

Figure 4:
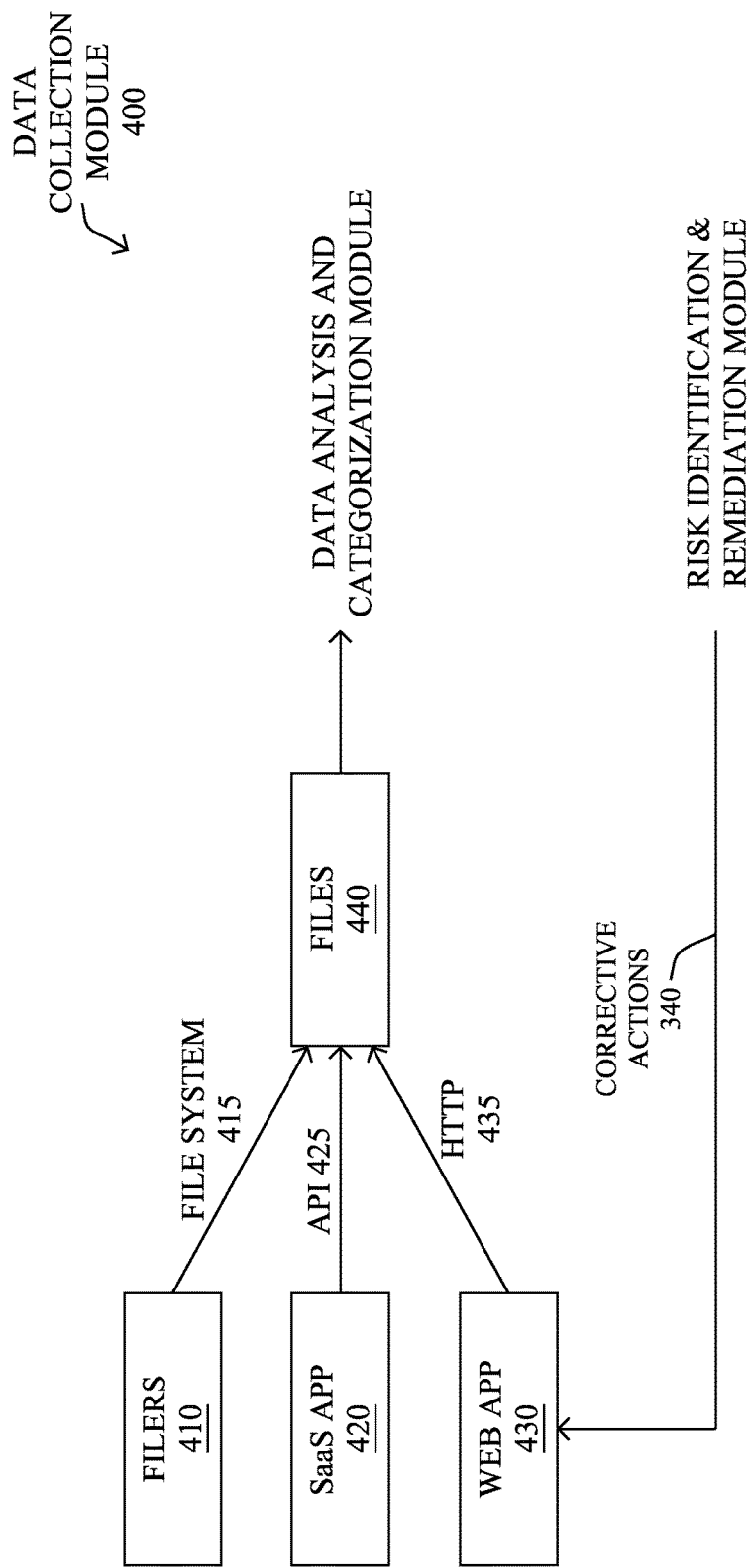
FIG. 4 illustrates an example data collection module of the security audit of data-at-rest system in accordance with one or more embodiments described herein.

Regarding the data collection module 310, FIG. 4 illustrates a detailed example of a data collection module 400. The techniques herein (SecureDAR) provide data collectors to collect data from various applications, services, or platforms. For instance, a filer collector collects from filers 410 via a file system 415, a cloud application collector collects from SaaS Apps 420 via APIs 425, a static web content collector collects from Web Apps 430 via HTTP 435, etc., in order to establish a set of files 440.

To process a large data volume effectively, the techniques herein have built the following common processes for these collectors:

Rate limiting process: to not negatively impact the source application's performance by controlling the processing rate limit based on: 1) predefined SLA (Service Level Agreement); 2) real-time responsiveness metrics;

Parallel Processing process: improves throughput by automatically dividing the target dataset into multiple parts based on the data collector's capacity, and process in parallel;

Pause and Resume process: to support pause and resume caused by planned or unplanned interruptions, SecureDAR collectors perform sorting on the target dataset, save the offset, and resume from where it stopped; and Filtering process: to support customized filters based on file paths, extensions, size, last modified timestamp, etc., to control the scope and improve performance.

Figure 5:
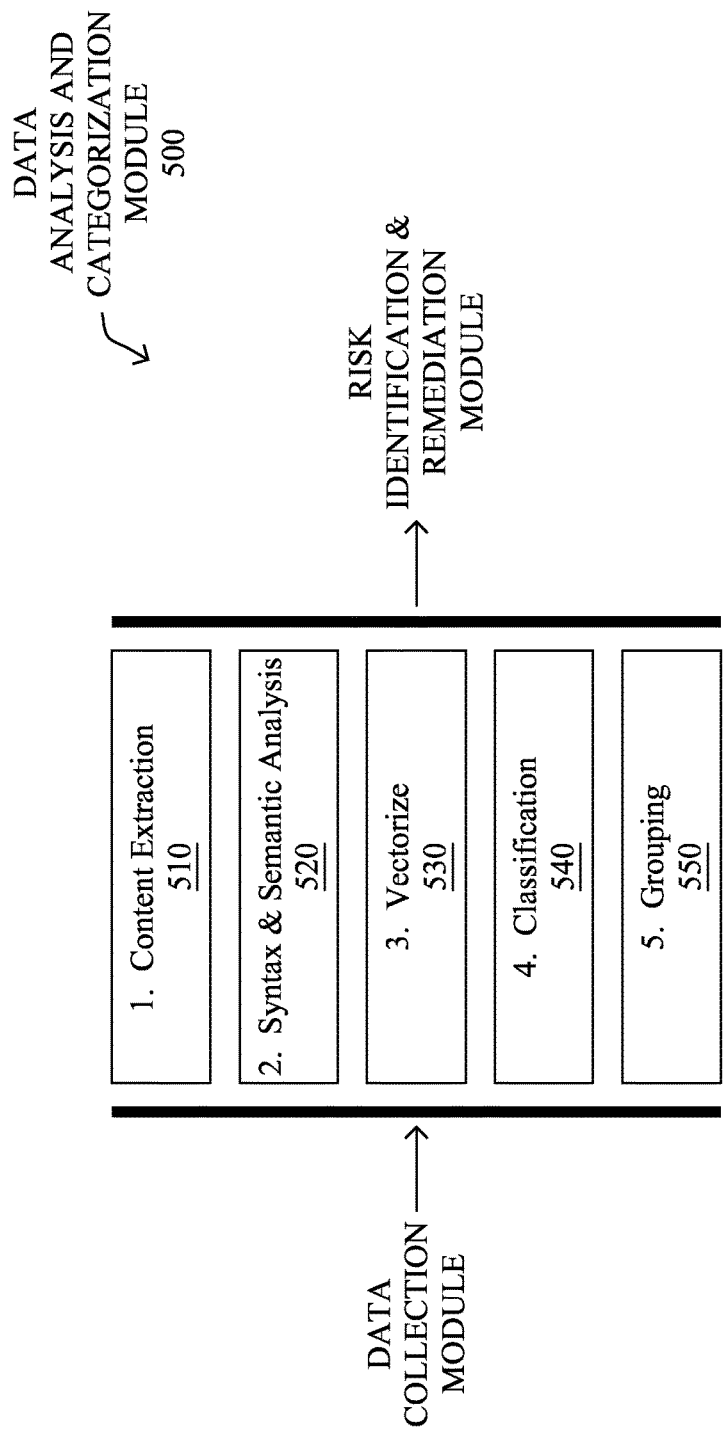
FIG. 5 illustrates an example data analysis and categorization module of the security audit of data-at-rest system in accordance with one or more embodiments described herein.

With the data collected, the techniques herein can further inspect the content and do data analysis. In particular, regarding the data analysis and categorization module 320 which receives this content, FIG. 5 illustrates a detailed example of a data analysis and categorization module 500. Illustratively, this component includes five steps, described below, where the outcome of these five steps is file-related metadata which can be further leveraged for risk identification by risk identification and remediation module 330.

Step 1. Content extraction 510—Here, the techniques herein take discovered data and convert the files, of various formats, into plain text. That is, NLP (natural language processing) only accepts texts as inputs. There are a large variety of formats of documents, however, such as .docx, .pdf or .jpg files, etc. For documents in binary formats, the techniques herein may use various text extraction technology to extract text content from them. For image files, other tools (e.g., OCR tools) may be used to extract text from the images.

Step 2. Syntax & Semantic Analysis 520—Now, the techniques herein break the plain text from step 1 above into word terms. That is, to understand the meaning and interpretation of each word and sentence in the documents, the techniques herein may use an NLP tool to convert text into word terms. For instance, the techniques herein may use a Name-Entity-Recognition tool capability to recognize PII (Personal Identifiable Information), PCI (Payment Card Industry), and PHI (Personal Health Information) patterns in the documents. Note that this NLP based semantics analysis approach provides a more accurate result which is a key differentiator than other solutions which commonly leverage regular expressions for the matching (e.g., requiring pre-defined, string-based rules, such as "this is an address field, this is a name field, etc.).

Step 3. Vectorization 530—Since NLP typically requires vectors, step 3 is an interim step to map the word terms into high-dimensional vectors as document features. That is, most of the machine learning based categorization algorithms take vectors as document features to be their inputs. Vectorizers may thus be used herein to convert word terms into vectors.

Step 4. Classification 540—This step puts documents into pre-defined categories based on the document features (vectors). The accuracy of classification capability is crucial to determine the effectiveness of a secure data-at-rest solution, particularly to reduce false positives. Lack of proper labelling of existing documents is quite common in an enterprise. Without the data being properly categorized, it would be impossible to identify the data owners and properly remediate the risks. The techniques herein illustratively implement a bi-dimensional classification approach, with a coarse classification and a fine classification. With reference briefly to table 600 of FIG. 6, a coarse-grain classifier (coarse classification 610) may identify, for example, the owning department of documents (e.g., HR, Engineering, Finance, etc.), whereas a fine-grain classifier (fine classification 620) may identify the target usage of the documents (Offer, Resume, Invoice, Roadmap, etc.). Various classification algorithms may be leveraged to implement both classifiers. This bi-dimensional classification approach answers two core questions in data-at-rest security challenges: 1) who is ultimately accountable for this document? and 2) what is this document used for? These answers will drive the result of policy matching and violation detection, and also the corrective action execution.

Step 5. Grouping 550—Returning to FIG. 5, the techniques herein may group relevant but unlabeled documents together, e.g., in an unsupervised way based on the similarity of content, in order to enrich the data set and derive a policy on the data. In particular, missing of information is a challenging bottleneck of the overall effectiveness of a data-at-rest security solution. The grouping capability herein addresses this challenge, thus the performance of grouping capability defines the performance of a secure data-at-rest solution. Grouping results can be leveraged for owner identification, usage identification as well as speed and space optimization, etc. However, supervised grouping is of very limited use due to most of the documents lacking proper prior labelling. The techniques herein thus provide a combined unsupervised grouping approach to bridge this critical gap. Namely, SecureDAR herein has three different grouping strategies working together: 1)

Duplication-based grouping, 2) Content similarity-based grouping, and 3) Classification-based grouping. For example, grouping in this manner will find and group multiple versions of the same document, determine which department it is associated with, and so on, thereby providing another reduction in dimension herein. Note that it is almost impossible to get a complete set of security metadata from any single file. By leveraging the grouping result, however, the techniques herein aggregate and summarize all the available pieces of metadata information from every file in the group to put together a complete security metadata profile and associate it back to the individual files in the group. This significantly improves the security metadata identification capabilities herein, far surpassing the current capabilities of other solutions.

Figure 7:
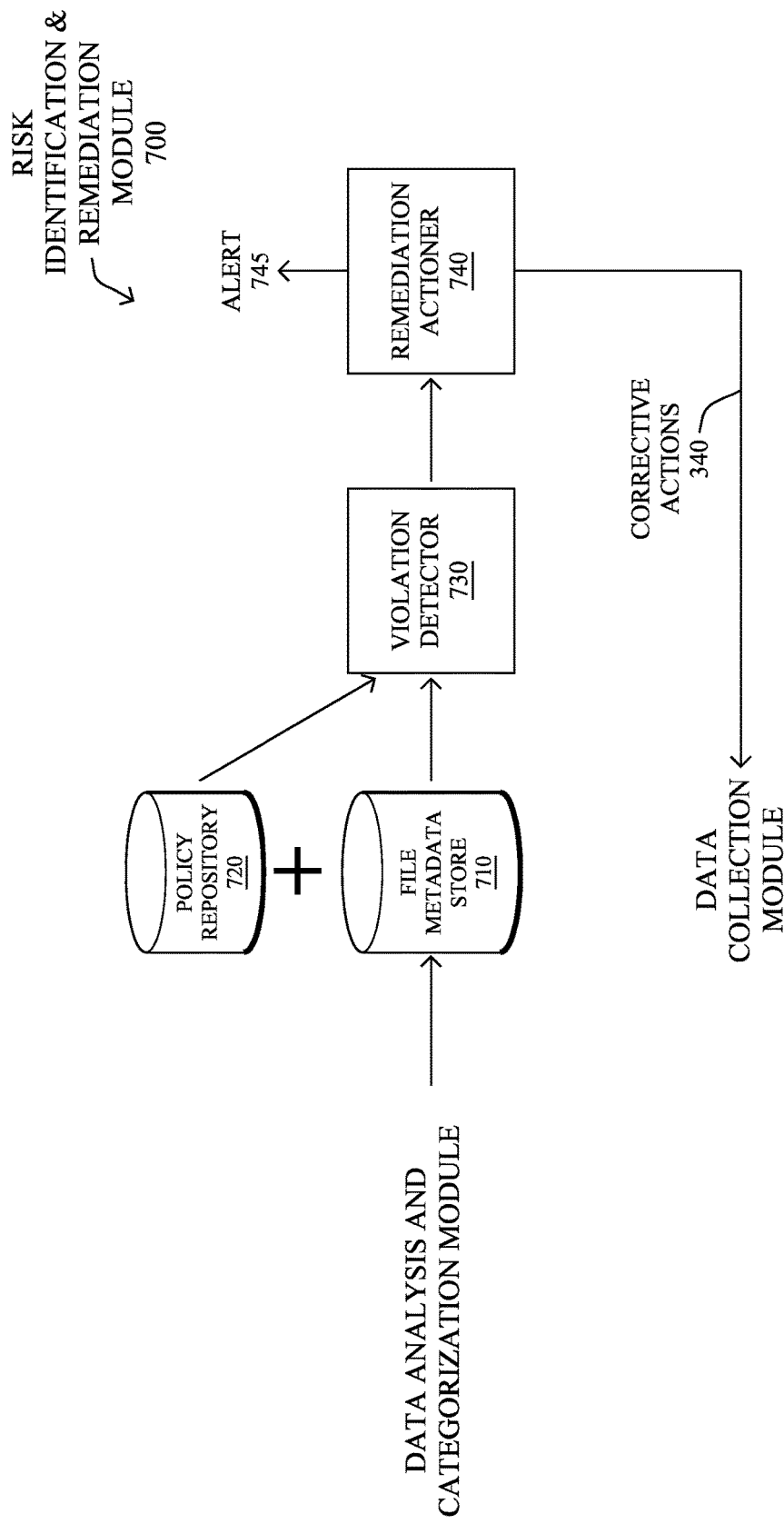
FIG. 7 illustrates an example risk identification and remediation module of the security audit of data-at-rest system in accordance with one or more embodiments described herein.

Turning now to the risk identification and remediation module 330, FIG. 7 illustrates a detailed example of a risk identification and remediation module 700. The techniques herein, in particular, take the information above from the data analysis and categorization module 500 into a file metadata store 710, and, as described in greater detail below, then apply a policy repository 720 and violation detector 730 to feed input into a remediation actioner 740, resulting in alerts 745 (e.g., to a user interface, administrator dashboards, security programs, and so on) and/or corrective actions 340 that are returned back to the data collection module 400.

Specifically, the techniques herein have a built-in policy repository 720 where the enterprise data security policies are configured. The data analysis results are correlated to the policy repository to detect any security violations. For example, if a highly confidential document is exposed to an unauthorized location, or has been shared too widely, the techniques herein can flag it as a security violation.

The policy repository 720 is also integrated with enterprise data taxonomy guidelines, such as Cisco's Data Advisor available from Cisco Systems, Inc. of San Jose California, to identify the plausible classification level of the documents processed, as well as what application can store which classification levels of data, etc. For example, corporate Research & Development (R&D) plans should be recognized as restricted data and should not be stored in cloud storage apps.

Regarding the remediation actioner 740, when a policy violation is detected by violation detector 730, the techniques herein may then apply remediation actions applicable to the security policies. For instance, example actions may be to do such things as (but not limited to):

Provide the visibility of enterprise data at risk and notify the data owners;

Quarantine the document at risk automatically to reduce the risk exposure;

Reduce the sharing scope of a sensitive document if it is widely shared (e.g., restrict use and/or sharing by certain applications, users, user groups, etc.);

Remove the document if no response/action from the data owner after X days of notifications, etc.

And so on.

The techniques described herein, therefore, provide for security audit of data-at-rest. In particular, the techniques herein provide the visibility of stored contents at rest, namely, the sensitivity level of the documents, where they are located, etc., and if any contents are stored against security policies, remediation actions are taken to quarantine or remove the content according to the security policy. The techniques herein fine-tune machine learning parameters, clean the data, and visualize the data (e.g., through investigation), so as to evaluate models and select the appropriate models for audit of data-at-rest.

As an example, legacy filer migration posts big challenges to companies. These filers may have been a dumping ground for all kinds of contents. It is exceedingly difficult to track the original authors (they may have already left the company) to properly identify the files. The techniques herein, however, provide a report on what files belong to which organization, and whether it is sensitive, so proper organizations can review and determine the migration strategies. In addition, the techniques herein can expose duplicate copies/similar copies of the same document on various locations, further helping the organization to consolidate and apply proper protections, accordingly.

Notably, the techniques herein are better than support vector machines (SVMs), which are good at binarizing text characters, but SVMs are not good at multi-class classification, like the techniques herein. Also, deep learning techniques require a lot of data in order to guarantee effectiveness, and thus are also not an adequate solution. The techniques herein, on the other hand, focus on dimension reduction to remove noise, reduce false positives, and so on, and utilize a combination of various algorithms to achieve better results overall. Note further that other techniques exist to scan files/data on a given filer or database based on pre-defined keywords or regular expressions to generate results of matched files/data with highlights of matched content. However, in many use cases, it is difficult to know the fixed keywords or regular expressions in advance, which also brings many false positives. Hence it is difficult for security admins to find much valuable data among the vast number of matched results. Also, while other techniques may focus on security posture evaluation and metrics, such systems are not designed to identify related documents or provide automated remediation as in the present disclosure.

For instance, unlike the techniques herein which classify documents based on their contents, other approaches often rely on data tracing, which can be handled in a controlled environment. However, pervasive data tracing is not practical for large and distributed data operations, such as enterprises with large footprints and "bring your own device" (BYOD) devices involved. Also, while SVM is good at binary classification, text classification is a multi-class classification problem, which SVM does not perform well. As such, the techniques herein leverage a multi-algorithm approach using both an optimized distributed gradient boosting library (machine learning algorithms implemented under the Gradient Boosting framework, particularly using a parallel tree boosting technique such as gradient boosting machines (GBM) and gradient boosting Decision Trees (GBDT)), and a multinomial Naive Bayes (MultinomialNB) classifier (suitable for classification with discrete features such as word counts for text classification). This combined algorithm proved to be superior in terms of accuracy and PPV (positive predictive value) to SVM and/or pervasive data tracing above.

Figure 8:
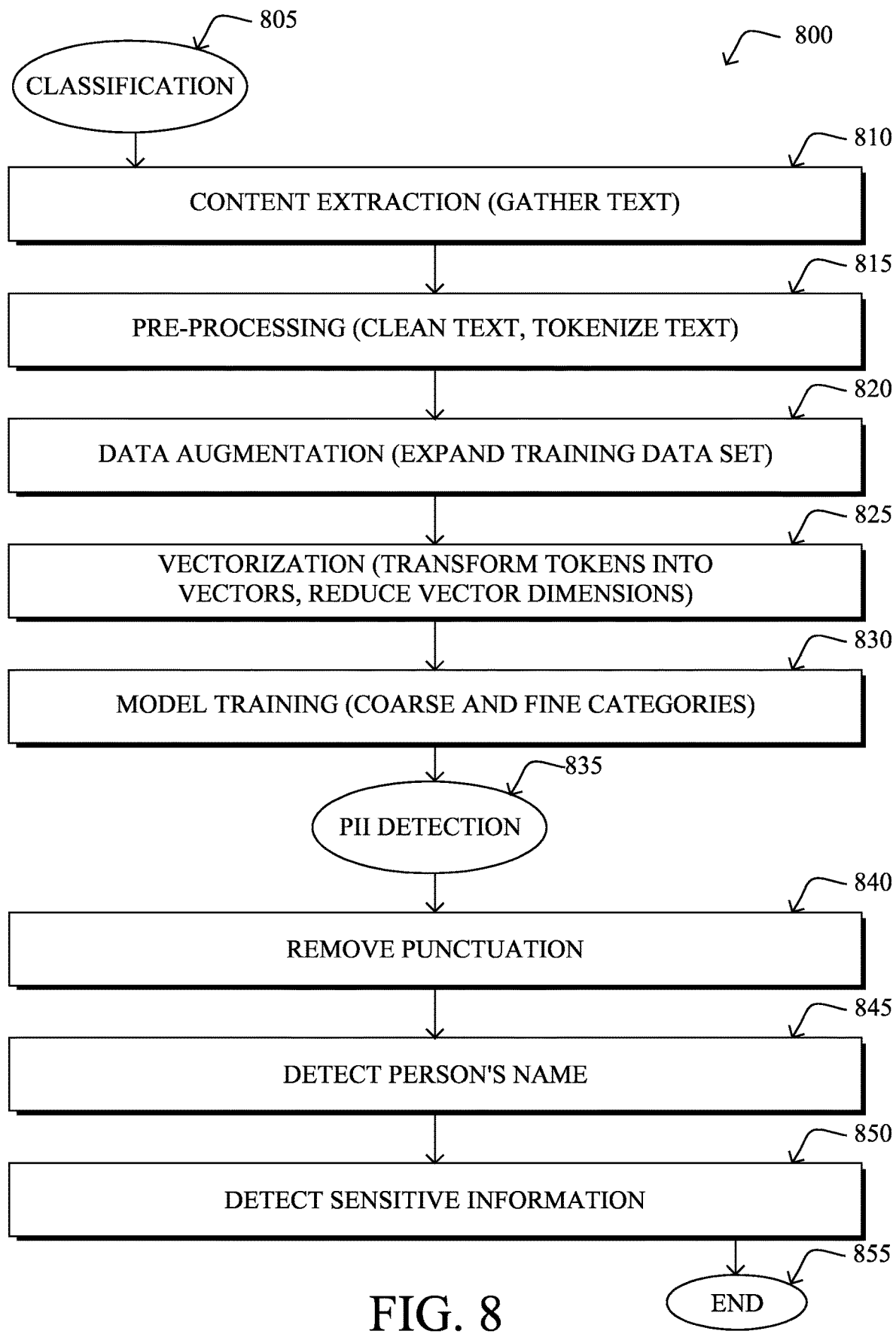
FIG. 8 illustrates an example simplified procedure for extracting semantics for PII detection in accordance with one or more embodiments described herein.

In particular, while current techniques may use regular expression/keywords-based matching to detect sensitive information in a document, thus classifying the document as sensitive or non-sensitive, it is too difficult to define all the keywords and patterns to match all the types of sensitive information in a large organization, and often leads to a high false-positive rate. The techniques herein, therefore, leverage NLP. TFIDF (term frequency-inverse document frequency, which is a numerical statistic that is intended to reflect how important a word is to a document in a collection or "corpus" based on various factors of the frequency of the word) and MultinomialNB techniques to extract the semantics of the documents and perform the classification based on the semantics data. FIG. 8 describes more detail about the step-by-step process 800 to extract the semantics for PII detection, for example.

Classification starts in step 805, where in step 810, content extraction occurs (gathering text). As noted above, NLP (natural language processing) only accepts texts as inputs, yet there are a large variety of formats of documents, such as .docx, .pdf or .jpg files, etc. As such, various tools may be used to extract text content from non-text files, image files, and so on. In step 815, pre-processing cleans text data by removing any stop-words, and by tokenizing the text. In step 820, data augmentation may be used to solve the problem of lacking training data by expanding the training data set (e.g., easy data augmentation or "EDA"). Step 825 vectorizes the data, such as by using TFIDF and 2-gram to transform tokens into vectors, optionally using a chi-squared test to reduce the dimension of vectors, as will be appreciated by those skilled in the art. Lastly, in step 830, model training occurs, for example by using MultinomialNB to train the model for coarse-grained categories and an optimized distributed gradient boosting library to train the model for fine-grained categories.

PII detection then starts in step 835, where in step 840 unnecessary punctuation is removed. Then in step 845, the techniques herein may detect a person's name, and then detect sensitive information in step 850, accordingly. Note that for PII, in particular, the techniques herein thus provide superior vector dimension reduction using a combination of NLP, TFIDF and MultinomialNB algorithms, allowing a very short "time to detect" that is faster than the current industry-wide averages for PII detection.

Figure 9:
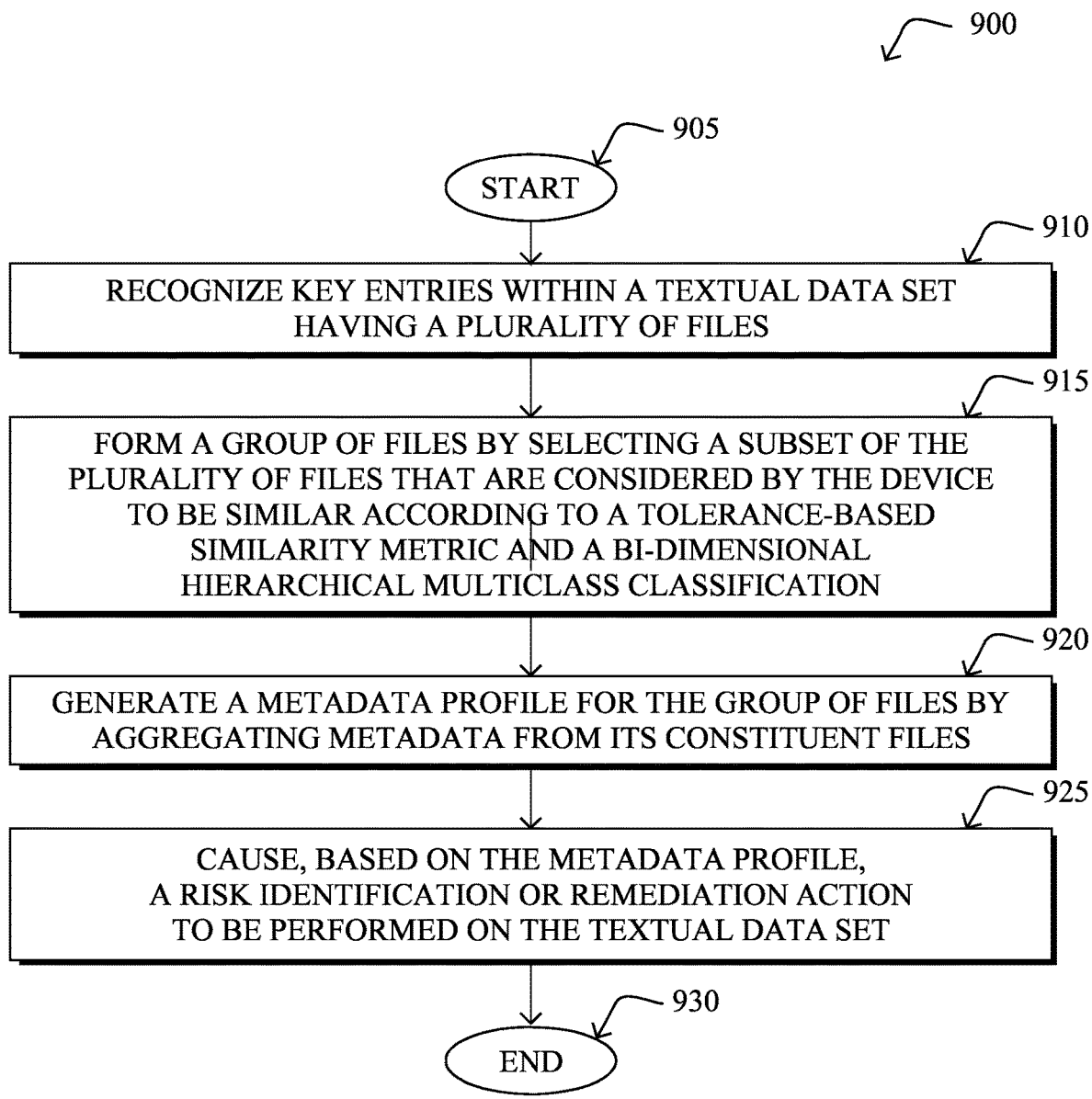
FIG. 9 illustrates an example simplified procedure for security audit of data-at-rest in accordance with one or more embodiments described herein.

In closing. FIG. 9 illustrates an example simplified procedure for security audit of data-at-rest. For example, a non-generic, specifically configured device (e.g., device 200) may perform procedure 900 by executing stored instructions (e.g., process 248, such as an audit process, security process, and so on). Procedure 900 may start at step 905, and continues to step 910, where, as described in greater detail above, the device recognizes key entries within a textual data set having a plurality of files, such as words, names, numbers, proper nouns, etc., which may be based on recognizing key entries from unformatted non-regular expression data, as described above.

In step 915, the techniques herein may then form a group of files by selecting a subset of the plurality of files that are considered by the device to be similar according to a tolerance-based similarity metric and a bi-dimensional hierarchical multiclass classification, and in step 920 may generate a metadata profile for the group of files by aggregating metadata from its constituent files. Note that according to the techniques herein, the device may notably form a plurality of groups by selecting a corresponding plurality of subsets of the plurality of files that are respectively considered by the device to be similar, and may generate a plurality of metadata profiles respectively for the plurality of groups by aggregating metadata from their constituent files, accordingly.

Also, as described in greater detail above, the bi-dimensional hierarchical multiclass classification may classify each of the plurality of files with a coarse classification (e.g., a team; a department; a business unit; a location; a region; an organization; a position; a company; a client, etc.) and a fine classification within the coarse classification (e.g., a file type; a document category; a particular usage; a document title; a document template; a particular form, etc.).

According to the techniques herein, in step 925, the device may cause, based on the metadata profile, a risk identification or remediation action to be performed on the textual data set. For example, in one embodiment this may be based on associating the metadata profile for the group of files with each constituent file within the group of files. In another embodiment, this may imply applying one or more security policies on the textual data set. In still another embodiment, causing the risk identification or remediation action to be performed on the textual data set may comprise: training a machine learning model for application on one or more other textual data sets. Also, as described above, the risk identification or remediation action may be based on identifying files as a categorical security level (e.g., public; confidential; highly confidential; restricted, etc.).

The simplified procedure 900 may then end in step 930, notably with the ability to continue processing data sets, accordingly. Other steps may also be included generally within procedure 900. For example, such steps (or, more generally, such additions to steps already specifically illustrated above), may include: obtaining the textual data set from one or more sources of data-at-rest data; obtaining a non-textual data set, and extracting, from the non-textual data set, text to generate the textual data set; vectorizing the textual data set and key entries for the bi-dimensional hierarchical multiclass classification; and so on.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

Illustratively, the techniques described herein may be performed by hardware, software, and/or firmware, such as in accordance with the illustrative SecureDAR process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: recognizing, by a device, key entries within a textual data set having a plurality of files; forming, by the device, a group of files by selecting a subset of the plurality of files that are considered by the device to be similar according to a tolerance-based similarity metric and a bi-dimensional hierarchical multiclass classification; generating, by the device, a metadata profile for the group of files by aggregating metadata from its constituent files; and causing, by the device and based on the metadata profile, a risk identification or remediation action to be performed on the textual data set.

In one embodiment, the bi-dimensional hierarchical multiclass classification classifies each of the plurality of files with a coarse classification and a fine classification within the coarse classification. In one embodiment, coarse classification is based on one or more categories selected from a group consisting of: a team; a department; a business unit; a location; a region; an organization; a position; a company; and a client. In one embodiment, fine classification is based on one or more categories selected from a group consisting of: a file type; a document category; a particular usage; a document title; a document template; and a particular form.

In one embodiment, forming the group of files comprises: forming a plurality of groups by selecting a corresponding plurality of subsets of the plurality of files that are respectively considered by the device to be similar. In one embodiment, generating the metadata profile for the group of files comprises: generating a plurality of metadata profiles respectively for the plurality of groups by aggregating metadata from their constituent files.

In one embodiment, causing the risk identification or remediation action to be performed on the textual data set comprises: associating the metadata profile for the group of files with each constituent file within the group of files.

In one embodiment, causing the risk identification or remediation action to be performed on the textual data set comprises: applying one or more security policies on the textual data set.

In one embodiment, causing the risk identification or remediation action to be performed on the textual data set comprises: training a machine learning model for application on one or more other textual data sets.

In one embodiment, the risk identification or remediation action comprises: identifying files as a categorical security level selected from a group consisting of: public; confidential; highly confidential; and restricted.

In one embodiment, the method further comprises: obtaining, from one or more sources of data-at-rest data, the textual data set.

In one embodiment, the method further comprises: obtaining a non-textual data set; and extracting, from the non-textual data set, text to generate the textual data set.

In one embodiment, key entries within the textual data set are selected from a group consisting keywords, names, numbers, and proper nouns.

In one embodiment, recognizing key entries within the textual data set is based on recognizing key entries from unformatted non-regular expression data.

In one embodiment, the method further comprises: vectorizing the textual data set and key entries for the bi-dimensional hierarchical multiclass classification.

According to the embodiments herein, an illustrative tangible, non-transitory, computer-readable medium herein may have computer-executable instructions stored thereon that, when executed by a processor on a computer, cause the computer to perform a method comprising: recognizing key entries within a textual data set having a plurality of files; forming a group of files by selecting a subset of the plurality of files that are considered by the computer to be similar according to a tolerance-based similarity metric and a bi-dimensional hierarchical multiclass classification; generating a metadata profile for the group of files by aggregating metadata from its constituent files; and causing, based on the metadata profile, a risk identification or remediation action to be performed on the textual data set.

Further, according to the embodiments herein an illustrative apparatus herein may comprise: one or more network interfaces to communicate with a network; a processor coupled to the one or more network interfaces and configured to execute one or more processes; and a memory configured to store a process that is executable by the processor, the process, when executed, configured to recognize key entries within a textual data set having a plurality of files; form a group of files by selecting a subset of the plurality of files that are considered by the process to be similar according to a tolerance-based similarity metric and a bi-dimensional hierarchical multiclass classification; generate a metadata profile for the group of files by aggregating metadata from its constituent files; and causing, based on the metadata profile, a risk identification or remediation action to be performed on the textual data set.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   recognizing, by a device, key entries within a textual data set having a plurality of files;
   forming, by the device, a group of files by selecting a subset of the plurality of files that are considered by the device to be similar according to a tolerance-based similarity metric and a bi-dimensional hierarchical multiclass classification;
   generating, by the device, a metadata profile for the group of files by aggregating metadata from its constituent files; and
   causing, by the device and based on the metadata profile, a risk identification or remediation action to be performed on the textual data set.

2. The method as in claim 1, wherein the bi-dimensional hierarchical multiclass classification classifies each of the plurality of files with a coarse classification and a fine classification within the coarse classification.

3. The method as in claim 2, wherein coarse classification is based on one or more categories selected from a group consisting of: a team; a department; a business unit; a location; a region; an organization; a position; a company; and a client.

4. The method as in claim 2, wherein fine classification is based on one or more categories selected from a group consisting of: a file type; a document category; a particular usage; a document title; a document template; and a particular form.

5. The method as in claim 1, wherein forming the group of files comprises:
   forming a plurality of groups by selecting a corresponding plurality of subsets of the plurality of files that are respectively considered by the device to be similar.

6. The method as in claim 5, wherein generating the metadata profile for the group of files comprises:
   generating a plurality of metadata profiles respectively for the plurality of groups by aggregating metadata from their constituent files.

7. The method as in claim 1, wherein causing the risk identification or remediation action to be performed on the textual data set comprises:
   associating the metadata profile for the group of files with each constituent file within the group of files.

8. The method as in claim 1, wherein causing the risk identification or remediation action to be performed on the textual data set comprises:
   applying one or more security policies on the textual data set.

9. The method as in claim 1, wherein causing the risk identification or remediation action to be performed on the textual data set comprises:
   training a machine learning model for application on one or more other textual data sets.

10. The method as in claim 1, wherein the risk identification or remediation action comprises:
    identifying files as a categorical security level selected from a group consisting of: public; confidential; highly confidential; and restricted.

11. The method as in claim 1, further comprising:
    obtaining, from one or more sources of data-at-rest data, the textual data set.

12. The method as in claim 1, further comprising:
    obtaining a non-textual data set; and
    extracting, from the non-textual data set, text to generate the textual data set.

13. The method as in claim 1, wherein key entries within the textual data set are selected from a group consisting of: key words; names; numbers; and proper nouns.

14. The method as in claim 1, wherein recognizing key entries within the textual data set is based on recognizing key entries from unformatted non-regular expression data.

15. The method as in claim 1, further comprising:
    vectorizing the textual data set and key entries for the bi-dimensional hierarchical multiclass classification.

16. A tangible, non-transitory, computer-readable medium having computer-executable instructions stored thereon that, when executed by a processor on a computer, cause the computer to perform a method comprising:
    recognizing key entries within a textual data set having a plurality of files;
    forming a group of files by selecting a subset of the plurality of files that are considered by the computer to be similar according to a tolerance-based similarity metric and a bi-dimensional hierarchical multiclass classification;
    generating a metadata profile for the group of files by aggregating metadata from its constituent files; and
    causing, based on the metadata profile, a risk identification or remediation action to be performed on the textual data set.

17. The tangible, non-transitory, computer-readable medium as in claim 16, wherein the bi-dimensional hierarchical multiclass classification classifies each of the plurality of files with a coarse classification and a fine classification within the coarse classification.

18. The tangible, non-transitory, computer-readable medium as in claim 16, wherein forming the group of files comprises:
    forming a plurality of groups by selecting a corresponding plurality of subsets of the plurality of files that are respectively considered by the computer to be similar; and
    generating a plurality of metadata profiles respectively for the plurality of groups by aggregating metadata from their constituent files.

19. The tangible, non-transitory, computer-readable medium as in claim 16, wherein causing the risk identification or remediation action to be performed on the textual data set comprises one of either:
    applying one or more security policies on the textual data set; and
    training a machine learning model for application on one or more other textual data sets.

20. An apparatus, comprising:
    one or more network interfaces to communicate with a network;
    a processor coupled to the one or more network interfaces and configured to execute one or more processes; and
    a memory configured to store a process that is executable by the processor, the process, when executed, configured to:
    recognize key entries within a textual data set having a plurality of files;
    form a group of files by selecting a subset of the plurality of files that are considered by the process to be similar according to a tolerance-based similarity metric and a bi-dimensional hierarchical multiclass classification;

generate a metadata profile for the group of files by aggregating metadata from its constituent files; and causing, based on the metadata profile, a risk identification or remediation action to be performed on the textual data set.

* * * * *